(12) United States Patent
Hamamoto et al.

(10) Patent No.: US 6,954,240 B2
(45) Date of Patent: Oct. 11, 2005

(54) METHOD OF PRODUCING POLARIZING PLATE, AND LIQUID CRYSTAL DISPLAY COMPRISING THE POLARIZING PLATE

(75) Inventors: Eiji Hamamoto, Ibaraki (JP); Youichirou Sugino, Ibaraki (JP); Kazuki Tsuchimoto, Ibaraki (JP); Senri Kondou, Ibaraki (JP); Seiichi Kusumoto, Ibaraki (JP)

(73) Assignee: Nitto Denko Corporation, Ibaraki (JP)

( * ) Notice: Subject to any disclaimer, the term of this patent is extended or adjusted under 35 U.S.C. 154(b) by 0 days.

(21) Appl. No.: 10/921,189

(22) Filed: Aug. 19, 2004

(65) Prior Publication Data

US 2005/0019505 A1 Jan. 27, 2005

Related U.S. Application Data

(63) Continuation of application No. 09/981,614, filed on Oct. 16, 2001, now Pat. No. 6,859,241.

(51) Int. Cl.$^7$ .................... G02F 1/1335; G02F 1/1333
(52) U.S. Cl. ............................ 349/96; 349/122
(58) Field of Search ................... 349/96, 122, 158, 349/117, 187

(56) References Cited

U.S. PATENT DOCUMENTS

| | | | | |
|---|---|---|---|---|
| 4,564,545 A | | 1/1986 | Okumura et al. | 428/76 |
| 5,180,470 A | * | 1/1993 | Smith et al. | 117/58 |
| 5,738,918 A | | 4/1998 | Shen et al. | 349/96 |
| 5,851,423 A | | 12/1998 | Teng et al. | 349/96 |
| 6,552,763 B1 | | 4/2003 | Kouya | 349/69 |
| 6,559,912 B2 | | 5/2003 | Aminaka | 349/96 |
| 6,840,635 B2 | * | 1/2005 | Maeda et al. | 359/512 |
| 6,859,241 B2 | * | 2/2005 | Hamamoto et al. | 349/96 |

FOREIGN PATENT DOCUMENTS

| | | |
|---|---|---|
| JP | 59-159109 | 9/1984 |
| JP | 2-253204 | 10/1990 |
| JP | 4-204803 | 7/1992 |
| JP | 7-294733 | 11/1995 |
| JP | 7-333425 | 12/1995 |
| JP | 8-271731 | 10/1996 |
| JP | 8-304624 | 11/1996 |
| JP | 10-62624 | 3/1998 |
| JP | 10-68821 | 3/1998 |
| JP | 10-142422 | 5/1998 |
| JP | 10-206615 | 8/1998 |
| JP | 2000-249832 | 9/2000 |

OTHER PUBLICATIONS

NAGATA; *Application of Polarizing Films*, CMC Co., Ltd.; First Edition, pp. 35–36, Feb. 10, 1986.
Grounds for Opposition (I) in Chinese w/ English Translation.
Grounds for Opposition (II) in Chinese w/ English Translation.
Catalog of Polarizing Plate issued by Optical Technology Corporation.
Web site of Optical Technology Corporation w/ English Translation.
Catalog of Polarizing Plate Product published on May 2001 by Sanritz Corporation.
Assay Report (Report for measured values of the samples corresponding to the evidences 3 and 6 in the test of water content).
Japanese Industrial Standard, Geometrical Product Specifications (GPS)—Surface Texture: Profile method—Terms, definitions and surface texture parameters, JIS B 0601:2001 (ISO 4287:1997).
Industrial Technology Research Institute, Center for Measurement Standards, Test Report No. D921107 dated Oct. 6, 2003.
Industrial Technology Research Institute Center for Center for Measurement Standards, Test Report No. D921108 dated Oct. 6, 2003.

* cited by examiner

*Primary Examiner*—Michael Lebentritt
*Assistant Examiner*—Walter L. Lindsay, Jr.
(74) *Attorney, Agent, or Firm*—Westerman, Hattori, Daniels & Adrian LLP

(57) ABSTRACT

A polarizing plate produced according to the present invention includes a polarizing film and a protective layer bonded to a surface of the polarizing film, where the protective layer has no irregularities like record grooves caused by stretching of the polarizing film, so that the polarizing plate with an improved appearance provides clear images even when reflected light is applied. Such a polarizing plate is produced by laminating a protective layer on at least one surface of a polarizer while limiting moisture content of the polarizer to a range from 5% to 30%. A value for the moisture content is obtained by a calculation based on an equation of moisture content (%)=[(A−B)/B]×100, when A denotes weight of the polarizer before bonding and B denotes weight of the polarizer after being kept in a dryer of 120° C. for seven hours.

33 Claims, No Drawings

METHOD OF PRODUCING POLARIZING PLATE, AND LIQUID CRYSTAL DISPLAY COMPRISING THE POLARIZING PLATE

This application is a continuation of application Ser. No. 09/981,614 filed on Oct. 16, 2001 now U.S. Pat. No. 6,859,241, which is hereby incorporated by reference in its entirety.

BACKGROUND OF THE INVENTION

1. Field of the Invention

The present invention relates to the field of polarizing plates for a liquid crystal display (LCD) and a liquid crystal display using polarizing plates.

2. Description of the Related Art

Recently, the use of LCDs in personal computers (PCs) or the like has increased sharply, and they have been used for monitors as well.

Typical polarizing plates used for display devices such as LCDs are produced from polyvinyl alcohol (PVA) films or the like. The PVA films are dyed with dichroic iodine or dichroic dyestuff, and then crosslinked with boric acid, borax or the like. The films are then be stretched uniaxially. The stretching step can be included in the dyeing and/or crosslinking steps. Alternatively, the film can be stretched before and/or after the dyeing and/or crosslinking steps. In general, the film is dried in a dryer or the like after the dyeing and crosslinking steps, and it is bonded to a protective layer such as a triacetylcellulose (TAC) film through an adhesive.

A polarizing plate used for a LCD is required to have high transmittance and a high polarization degree. For this purpose, a PVA film should be stretched at a high ratio. However, when a PVA film is stretched at a high stretch ratio, irregularities like grooves on a record may be generated on the polarizer surface, and this will impair the appearance. The irregularities can be recognized even through a protective film like a TAC film or a polyethylene terephthalate (PET) film bonded to the polarizer. As a result, images provided by the polarizing plate will be blurred when reflected light is applied.

SUMMARY OF THE INVENTION

The present invention provides a method of producing a polarizing plate having an improved appearance and also a liquid crystal display comprising the polarizing plate. In this context, "improved appearance" means that a protective layer of the polarizing plate substantially has no irregularities like grooves on a record caused by stretching of a polarizing film bonded to the protective layer. Such a polarizing plate can provide dear images even when reflected light is applied In a method of producing a polarizing plate according to the present invention, a protective layer is bonded to at least one surface of a polarizer so as to provide a polarizing plate having transmittance of at least 35% and a polarization degree of at least 90%. This method is characterized in that moisture content of the polarizer is in a range from 5% to 30% during a step that the protective layer is bonded to the polarizer. A measurement value is obtained by a calculation based on an equation of moisture content (%)=[(A−B)/B]× 100, when A denotes weight of the polarizer before bonding and B denotes weight of the polarizer after being kept in a dryer of 120° C. for seven hours.

When the moisture content is less than 5%, the polarizer becomes hard. This causes irregularities like record grooves on the surface, and a crosslinking agent tends to be deposited from the polarizer so as to deteriorate the appearance. Moisture content over 30% will cause some disadvantages such as adhesion failure when the polarizer is bonded to a protective layer such as a TAC film. Moreover, irregularities occur due to discoloring of iodine in the polarizing plate during a drying treatment subsequent to bonding of the TAC film. A further preferred range for the moisture content of the polarizer is from 9% to 27%.

The surface roughness of the polarizing plate in a direction perpendicular to the stretching direction plate is at most 0.04 $\mu$m on the basis of the centerline average roughness. When the roughness exceeds 0.04 $\mu$m, visual recognition of irregularities may be facilitated. That is, irregularities will be prominent. It is especially preferable that the surface roughness is not more than 0.01 $\mu$m, since no streaks will be recognized visually.

The surface roughness can be calculated in accordance with Japanese Industrial Standard (JIS) B 0601-1994.

Preferably, the polarizer is bonded to a protective layer through an adhesive layer, so that peeling of the protective layer from the polarizer can be prevented.

The polarizer is produced by stretching a hydrophilic polymer film while dyeing in a dye bath containing dichroic iodine or dichroic dyestuff, and then crosslinking in a crosslinking bath containing a crosslinking agent. A preferred example of such hydrophilic polymer films is a polyvinyl alcohol-based film from the aspect of the excellent dye-affinity.

In one embodiment, the polarizing plate can be either a reflective or a semitransparent reflective polarizing plate obtained by laminating either a reflecting plate or a semitransparent reflecting plate on any of the above-mentioned polarizing plates.

In one embodiment, the polarizing plate can be obtained by laminating a retardation plate ($\lambda$ plate) on any of the above-mentioned polarizing plates so as to cope with either elliptically or circularly polarized light.

In one embodiment, the polarizing plate can be obtained by laminating a viewing angle compensating film on any of the above-mentioned polarizing plates.

In one embodiment, the polarizing plate can be obtained by laminating a brightness-enhanced film on any of the above-mentioned polarizing plates by using an adhesive or a pressure-sensitive adhesive.

A liquid crystal display according to the present invention comprises a liquid crystal cell and a polarizing plate prepared in the above-mentioned process, and the polarizing plate is provided to at least one surface of the liquid crystal cell.

DETAILED DESCRIPTION OF THE INVENTION

According to a method of producing a polarizing plate, a polarizer having a polarizing function is obtained by subjecting a PVA film to respective steps such as swelling, dyeing, stretching, crosslinking and drying. Later, the polarizer is bonded to a protective film of TAC, PET or the like through an adhesive or a pressure-sensitive adhesive so as to provide a polarizing plate.

There is no specific limitation on the order of four steps of swelling, dyeing, stretching and crosslinking. Some or all of the four steps can be performed simultaneously.

In the present invention, irregularities like record grooves on the polarizer or on the polarizing plate can substantially be prevented by limiting the moisture content of the polarizer in a range from 5% to 30% during a step of bonding the polarizer and the protective layer.

Generally, a polarizer of a PVA film, which is processed through steps including swelling, dyeing, stretching, crosslinking and drying, is wound into a roll for the following steps. Such a polarizer can be produced in a continuous series of steps including adjustment of the moisture content of the polarizer by humidification or the like, before bonding the polarizer to a protective layer such as a TAC film.

A typical process of producing a polarizing film comprises three steps of dyeing, crosslinking and stretching. In a dyeing step, a PVA film is dyed in a bath containing dichroic iodine or dyestuff. In a crosslinking step, the film is crosslinked in a bath containing a PVA crosslinking agent such as boric acid and borax. In a stretching step, the PVA film is stretched. Stretching is often performed simultaneously with the dyeing and crosslinking steps, but it can be carried out separately. Alternatively, the dyeing step and the crosslinking step can be performed at the same time. Subsequent to the three steps, the PVA film is dried and then, a protective layer such as a TAC film or a PET film is bonded to at least one surface of the PVA film.

In one embodiment, a polarizer (polarizing film) is prepared from a conventional hydrophilic polymer film comprising a suitable vinyl alcohol-based polymer such as polyvinyl alcohol and partially formalized polyvinyl alcohol. The film is treated in a suitable order and a suitable process, for example, dyeing with a dichroic substance selected from, e.g., iodine and dichroic dyestuff, stretching and crosslinking. A preferable polarizer will transmit linearly polarized light when natural light enters. It is more preferable that the polarizer has excellent optical transmittance and polarization degree.

A polarizing plate having high transmittance and a high polarization degree can comprise a polarizer (polarizing film) that is prepared by stretching a hydrophilic polymer film or the like having a thickness in a range from 10 μm to 200 μM, or preferably from 30 μm to 80 μm, in a total stretch ratio ranging from 4 to 7 times the original length, or preferably from 5 to 6.5 times. When the stretch ratio is less than 4, the obtained polarizer would not have a sufficient polarization degree. When the total stretch ratio exceeds 7, the film tends to break during stretching, so that stable supply of polarizing films will be prevented. A hydrophilic polymer film having a thickness of less than 10 μm is difficult to stretch because the film tends to break, while a hydrophilic polymer film having a thickness of more than 200 μm is difficult to dry during film-formation and thus, problems such as foaming will occur easily. Specifically, it is difficult to dry such a thick film uniformly, and a film that is not dried uniformly may cause swelling and dye-irregularities in manufacturing the polarizing film.

Any appropriate transparent film can be used for a protective film to form a transparent protective layer on at least one surface of a polarizer (polarizing film). One typical and non-limiting example of polymers for the protective film is an acetate-based resin such as triacetylcellulose. Examples of alternative polymers include transparent films of resins based on polycarbonate, polynorbornene, polyesters such as PET, polyether sulfone, polyamide, polyimide, polyolefins such as polyethylene, polystyrene, and acrylic substances, or films of resins that will be cured by heat or ultraviolet rays, based on acrylic substances, urethane, acrylic urethane, epoxy, and silicones.

A transparent protective film preferred especially from the aspect of polarizing characteristics and durability is a TAC film having a surface saponified with an alkali substance or the like. Transparent protective films formed on both surfaces of a polarizing film are not necessarily made of identical polymers.

A transparent protective film used for the protective layer can be treated to provide properties such as hard coating, antireflection, anti-sticking, diffusion and anti-glaring, as long as the purposes of the present invention are not sacrificed. Hard coating treatment is applied, for example, to prevent scratches on the surfaces of the polarizing plate. A surface of the transparent protective film can be applied with a coating film of a cured resin with excellent hardness and smoothness, e.g., a silicone-based ultraviolet-cure type resin.

Antireflection treatment may be applied to prevent reflection of outdoor daylight on the surface of the polarizing plate. Such an anti-reflection film or the like can be formed in a known method. Anti-sticking treatment is applied to prevent adherence of adjacent layers. Anti-glare treatment is applied to prevent visibility of light transmitted through the polarizing plate from being hindered by outdoor daylight reflected on the polarizing plate surface. Anti-glare treatment can be carried out by providing microscopic asperity on a surface of a transparent protective film in an appropriate manner, e.g., by roughening the surface by sand-blasting or embossing, or by blending transparent particles.

The above-mentioned transparent fine particles will be selected from silica, alumina, titania, zirconia, stannic oxide, indium oxide, cadmium oxide, antimony oxide or the like, and the particles have an average diameter ranging from 0.5 μm to 20 μm. Inorganic fine particles having electroconductivity can be used as well. Alternatively, the particles can be organic fine particles comprising, for example, crosslinked or uncrosslinked polymer particles. An amount of the transparent fine particles ranges from 2 weight parts to 70 weight parts, and generally, from 5 weight parts to 50 weight parts, for 100 weight parts of a transparent resin.

An anti-glare layer comprising transparent fine particles can be provided as the transparent protective layer or a coating layer applied onto a transparent protective layer surface. The anti-glare layer can function as a diffusion layer to diffuse light transmitted through the polarizing plate in order to enlarge visual angles (this function is denoted as visual angle compensation). The above-mentioned layers such as the antireflection layer, the anti-sticking layer, the diffusion layer and the anti-glare layer can be provided as an sheet of optical layers comprising these layers separately from the transparent protective layer.

There is no specific limitation on a method to adhere the polarizer (polarizing film) and the transparent protective film. Adhesion can be applied, for example, by using adhesives such as an adhesive comprising vinyl alcohol-based polymer, or an adhesive comprising at least the vinyl alcohol-based polymer and a water-soluble agent to crosslink the vinyl alcohol-based polymer, such as boric acid, borax, glutaraldehyde, melamine and oxalic acid. A polyvinyl alcohol-based adhesive is preferred especially since it has the best adherence with polyvinyl alcohol-based films. Such an adhesive layer is formed by, for example, applying and drying an aqueous solution, and an additive or a catalyst such as an acid can be blended in preparation of the aqueous solution if required.

A polarizing plate of the present invention can be laminated with another optical layer in order to be used as an optical member. Though there is no specific limitation on the optical layer, one or more suitable optical layer applicable for formation of a liquid crystal display can be used, and the optical layer can be selected from, for example, a reflecting plate, a semitransparent reflecting plate, a retardation plate such as a λ plate like a half wavelength plate and a quarter wavelength plate, a viewing angle compensating film, and a brightness-enhanced film. In a preferred embodiment, a reflective polarizing plate or a semitransparent reflective polarizing plate formed by laminating an additional reflecting plate or a semitransparent reflecting plate on the above-mentioned polarizing plate comprising a polarizer and a protective layer according to the present invention; a polarizing plate formed by laminating an additional retardation plate on the above-mentioned polarizing plate comprising a polarizer and a protective layer; a polarizing plate having a viewing angle compensating film laminated additionally on the above-mentioned polarizing plate comprising a polarizer and a protective layer; and a polarizing plate having a brightness-enhanced film laminated additionally on the above-mentioned polarizing plate comprising a polarizer and a protective layer is used.

A reflecting plate is provided to a polarizing plate in order to form a reflective polarizing plate. In general, such a reflective polarizing plate is arranged on a backside of a liquid crystal cell in order to make a liquid crystal display to reflect incident light from a visible side (display side). The reflective polarizing plate has some merits, for example, assembling of light sources such as backlight can be omitted, and the liquid crystal display can be thinned further.

The reflective polarizing plate can be formed in an appropriate manner such as attaching a reflecting layer of metal or the like on one surface of the polarizing plate. For example, a transparent protective film is prepared by matting one of the surfaces if required. On this surface, a foil comprising a reflective metal such as aluminum or a deposition film is applied to form a reflecting layer.

An additional example of a reflective polarizing plate comprises the above-mentioned transparent protective film having a surface of a microscopic asperity due to contained fine particles, and also a reflecting layer corresponding to the microscopic asperity The reflecting layer having a microscopic asperity surface diffuses incident light irregularly so that directivity and glare can be prevented and irregularity in color tones can be controlled. This transparent protective film can be formed by attaching a metal directly on a surface of a transparent protective film in any appropriate methods including deposition such as vacuum deposition, and plating such as ion plating and sputtering.

Alternatively, the reflecting plate can be used as a reflecting sheet formed by providing a reflecting layer onto a proper film similar to the transparent protective film. Since a typical reflecting layer of a reflecting plate is made of a metal, it is used preferably in a state coated with a film, a polarizing plate or the like in order to prevent the reflection rate from reduction due to oxidation. As a result, the initial reflection rate is maintained for a long period, and a separate protective layer can be omitted.

A semitransparent polarizing plate is provided by replacing the reflecting layer in the above-mentioned reflective polarizing plate by a semitransparent reflecting layer, and it is exemplified by a half mirror that reflects and transmits light at the reflecting layer. In general, such a semitransparent polarizing plate is arranged on a backside of a liquid crystal cell. In a liquid crystal display comprising the semitransparent polarizing plate, incident light from the visible side (display side) is reflected to display an image when a liquid crystal display is used in a relatively bright atmosphere, while in a relatively dark atmosphere, an image is displayed by using a built-in light source such as a backlight in the backside of the semitransparent polarizing plate. In other words, the semitransparent polarizing plate can be used to form a liquid crystal display that can save energy for a light source such as a backlight under a bright atmosphere, while a built-in light source can be used under a relatively dark atmosphere.

The above-mentioned polarizing plate comprising a polarizer and a protective layer can have an additional laminate of a retardation plate.

The retardation plate is used for modifying linearly polarized light to either elliptically polarized light or circularly polarized light, modifying either elliptically polarized light or circularly polarized light to linearly polarized light, or modifying a polarization direction of linearly polarized light. For example, a retardation plate called a quarter wavelength plate (λ/4 plate) is used for modifying linearly polarized light to either elliptically polarized light or circularly polarized light, and for modifying either elliptically polarized light or circularly polarized light to linearly polarized light. A half wavelength plate (λ/2 plate) is used in general for modifying a polarization direction of linearly polarized light.

The above-described polarizing plate concerning elliptical polarized light is effective in compensating (preventing) colors (blue or yellow) generated due to birefringence in a liquid crystal layer of a super twist nematic (STN) liquid crystal display so as to provide a black-and-white display free of such colors. Controlling three-dimensional refractive index is preferred further since it can compensate (prevent) colors that will be observed when looking a screen of the liquid crystal display from an oblique direction. A polarizing plate concerning circularly polarized light is effective in adjusting color tones of an image of a reflective liquid crystal display that has a color image display, and the polarizing plate serves to prevent reflection as well.

Specific examples of the retardation plates include birefringent films, oriented films of liquid crystal polymers, sheets comprising film and oriented layers supported by the films, and incline-oriented films. The birefringent films can be prepared by stretching films of any suitable liquid crystal polymers such as polycarbonate, polyvinyl alcohol, polystyrene, polymethyl methacrylate, polyolefins including polypropylene, polyalylate, and polyamide. An incline-oriented film is produced, for example, by bonding a heat shrinkable film onto a polymer film and stretching and/or shrinking the polymer film under an influence of the shrinking force provided by heat, or by orienting obliquely a liquid crystal polymer.

A polarizing plate described below comprises the above-mentioned polarizer and protective layer, and further an additional viewing angle compensating film laminated on the polarizing plate.

A viewing angle compensating film is used for widen an visual angle so that an image can be clear relatively when a screen of a liquid crystal display is seen not in a direction perpendicular to the screen but in a slightly oblique direction.

Such a viewing angle compensating film can be a triacetylcellulose film coated with a discotic liquid crystal, or a retardation plate. While an ordinary retardation plate is a birefringent polymer film that is stretched uniaxially in the face direction, a retardation plate used for an viewing angle compensating film is a two-way stretched film such as a birefringent polymer film stretched biaxially in the face direction and an incline-oriented polymer film with controlled birefringence in the thickness direction that is stretched uniaxially in the face direction and stretched also in the thickness direction. The incline-oriented film is prepared by, for example, bonding a heat shrinkable film to a polymer film and stretching and/or shrinking the polymer film under an influence of shrinkage force provided by heat, or by orienting obliquely a liquid crystal polymer. A polymer as a material of the retardation plate is similar to the polymer used for the above-mentioned retardation plate.

A polarizing plate described below is produced by laminating a brightness-enhanced film additionally on the above-mentioned polarizing plate comprising a polarizer and a protective layer. Generally, this polarizing plate is arranged on a backside of a liquid crystal cell. When natural light enters, by reflection from a backlight or a backside of a liquid crystal display etc., the brightness-enhanced film reflects linearly polarized light of a predetermined polarizing axis or circularly polarized light in a predetermined direction while the same film transmits other light. It allows entrance of light from a light source such as a backlight so as to obtain transmitted light in a predetermined polarization state, while reflecting light other than light in the predetermined polarization state. Light that is reflected at this brightness-enhanced film is reversed through a reflecting layer or the like arranged additionally behind the brightness-enhanced film. The reversed light that reenters the brightness-enhanced plate is transmitted partly or entirely as light in a predetermined polarization state, so that light transmitting the brightness-enhanced film is increased and polarized light that is hardly absorbed in the polarizer is supplied. As a result, quantity of light available for the liquid crystal display etc. can be increased to enhance brightness. When light enters through a polarizer from the backside of a liquid crystal cell by using a backlight or the like without using any brightness-enhanced films, most light is absorbed in the polarizer but not transmitted the polarizer if the light has a polarization direction inconsistent with the polarization axis of the polarizer. Depending on characteristics of the polarizer, about 50% of light is absorbed in the polarizer, and this decreases quantity of light available in the liquid crystal display or the like and makes the image dark. The brightness-enhanced film repeatedly prevents light having a polarization direction to be absorbed in the polarizer from entering the polarizer, and reflects the light on the brightness-enhanced film, reverses the light through a reflecting layer or the like arranged behind, and makes the light re-enter the brightness-enhanced plate. Since the polarized light that is reflected and reversed between them is transmitted only if the light has a polarization direction to pass the polarizer, light from a backlight or the like can be used efficiently for displaying images of a liquid crystal display in order to provide a bright screen.

A suitable example of the brightness-enhanced film is selected from a multilayer thin film of a dielectric or a multilayer lamination of thin films with varied refraction aeolotropy (e.g., "D-BEF" supplied by 3M Co.) that transmits linearly polarized light having a predetermined polarization axis while reflecting other light, and a cholesteric liquid crystal layer, more specifically, an oriented film of a cholesteric liquid crystal polymer or an oriented liquid crystal layer fixed onto a supportive substrate (e.g., "PCF 350" supplied by Nitto Denko Corporation; "Transmax" supplied by Merck and Co., Inc.) that reflects either clockwise or counterclockwise circularly polarized light while transmitting other light.

Therefore, for a brightness-enhanced film to transmit linearly polarized light having a predetermined polarization axis, the transmission light enters the polarizing plate by matching the polarization axis so that absorption loss due to the polarizing plate is controlled and the light can be transmitted efficiently. For a brightness-enhanced film to transmit circularly polarized light, i.e., a cholesteric liquid crystal layer, preferably, the transmission circularly polarized light is converted to linearly polarized light before entering the polarizing plate in an aspect of controlling of the absorption loss, though the circularly polarized light can enter the polarizer directly. Circularly polarized light can be converted to linearly polarized light by using a quarter wavelength plate for a retardation plate.

A retardation plate having a function as a quarter wavelength plate in a wide wave range including a visible light region can be obtained, for example, by overlapping a retardation layer functioning as a quarter wavelength plate for monochromatic light such as light having 550 nm wavelength and another retardation plate showing a separate optical retardation property (e.g., a retardation plate functioning as a half wavelength plate). Therefore, a retardation plate arranged between a polarizing plate and a brightness-enhanced film can comprise a single layer or at least two layers of retardation layers.

A cholesteric liquid crystal layer also can be provided by combining layers different in the reflection wavelength and it can be configured by overlapping two or at least three layers. As a result, the obtained retardation plate can reflect circularly polarized light in a wide wavelength range including a visible light region, and this can provide transmission circularly polarized light in a wide wavelength range.

A polarizing plate according to the present invention can be made by laminating a polarizing plate and two or at least three optical layers, similarly to the above-described polarization-separation type polarizing plates. In other words, the polarizing plate can be a reflective polarizing plate or a semitransparent polarizing plate for elliptically polarized light, which is prepared by combining either the above-mentioned reflective polarizing plate or a semitransparent polarizing plate with a retardation plate. An optical member comprising a lamination of two or at least three optical layers can be formed in a method of laminating layers separately in a certain order for manufacturing a liquid crystal display etc. Since an optical member that has been laminated previously has excellent stability in quality and assembling operability, efficiency in manufacturing a liquid crystal display can be improved. Any appropriate adhesion means such as a pressure-sensitive adhesive can be used for laminating the polarizing plate and optical layers.

A pressure-sensitive adhesive layer can be provided to a polarizing plate or to an optical member in the present invention for adhesion with other members such as a liquid crystal cell. The pressure-sensitive adhesive layer can contain any suitable pressure-sensitive adhesives such as an acrylic adhesive in accordance with conventional techniques. Particularly, pressure-sensitive adhesive layers having a low moisture absorption coefficient and an excellent heat resistance is preferred from the aspect of prevention of foaming or peeling caused by moisture absorption or prevention of decrease in the optical properties and warping of a liquid crystal cell caused by difference in thermal expansion coefficients. As a result, a high quality liquid crystal display having excellent durability can be produced. The pressure-sensitive adhesive layer can include fine particles to obtain optical diffusivity. Pressure-sensitive adhesive layers can be provided to appropriate surfaces if required. For example, a polarizing plate comprising a polarizer and a protective layer can be provided with a pressure-sensitive adhesive layer on at least one surface of the protective layer.

When a pressure-sensitive adhesive layer is exposed on a surface of the polarizing plate or the optical member, preferably, the pressure-sensitive adhesive layer is covered with a separator by the time the pressure-sensitive adhesive layer is used so that contamination will be prevented. The separator can be made of an appropriate thin sheet by coating a peeling agent if required, and the peeling agent may be selected, for example, from a silicone-based agent, a long-chain alkyl-based agent, a fluorine-based agent, an agent comprising molybdenum sulfide or the like.

The above-described members composing a polarizing plate and an optical member, such as a polarizer, a transparent protective film, an optical layer and a pressure-sensitive adhesive layer, can have ultraviolet absorption power as a result of treatment with an ultraviolet absorber such as an ester salicylate compound, a benzophenone compound, a benzotriazole compound, a cyanoacrylate compound, and a nickel complex salt compound.

Polarizing plates according to the present invention can be used preferably for forming various devices such as LCDs. Such a polarizing plate is arranged on at least one surface of a liquid crystal cell in order to form various devices such as a liquid crystal display. The liquid crystal display is selected from devices of conventionally known structures, such as transmission type, reflection type, or a transmission-reflection type. A liquid crystal cell to compose the liquid crystal display can be selected from appropriate cells of such as active matrix driving type represented by a thin film transistor, a simple matrix driving type represented by a twist nematic type and a super twist nematic type.

When polarizing plates or optical members are arranged on both surfaces of a liquid crystal cell, the polarizing plates or the optical members on the surfaces can be the same or can be varied. Moreover, for forming a liquid crystal display, one or at least two layers of appropriate members such as a prism array sheet, a lens array sheet, an optical diffuser and a backlight can be arranged at proper positions.

The present invention will be described below more specifically by referring to Examples and Comparative Examples.

EXAMPLE 1

A polarizer was obtained by dyeing a PVA film supplied by Kuraray Co., Ltd. (9X75RS, having a polymerization degree of 2400 and a thickness of 75 $\mu$m) in a first bath (a 30° C. aqueous solution containing both iodine and potassium iodine (KI)) while stretching to 3 times, further stretching in a second bath (a 55° C. aqueous solution containing both boric acid and KI) so as to stretch the film to 6 times in total its original length. Later, the polarizer was adjusted to have moisture content of 6% by means of a dryer and a humidifier under controlled condition for temperature, humidity, air volume, and time. Subsequently, TAC films were bonded to a top and a bottom surface of the polarizer through a PVA-based adhesive in order to provide a polarizing plate. A value for the moisture content is obtained by a calculation based on an equation of moisture content (%)=[(A−B)/B]×100, when A denotes weight of the polarizer before bonding and B denotes weight of the polarizer after being kept in a dryer of 120° C. for seven hours.

EXAMPLE 2

A polarizer was obtained by dyeing a PVA film supplied by Kuraray Co., Ltd. (9X75RS) in a first bath (a 30° C. aqueous solution containing both iodine and KI) while stretching to 3 times, further stretching in a second bath (a 55° C. aqueous solution containing both boric acid and KI) so as to stretch the film to 6 times in total Later, the polarizer was adjusted to have moisture content of 15% by means of a dryer and a humidifier under controlled conditions for temperature, humidity, air volume, and time. Subsequently, TAC films were bonded to both surfaces of the polarizer through a PVA-based adhesive in order to provide a polarizing plate.

EXAMPLE 3

A polarizer was obtained by dyeing a PVA film supplied by Kuraray Co., Ltd. (9X75RS) in a first bath (a 30° C. aqueous solution containing both iodine and KI) while stretching to 3 times, further stretching in a second bath (a 55° C. aqueous solution containing both boric acid and KI) so as to stretch the film to 6 times in total Later, the polarizer was adjusted to have moisture content of 26% by means of a dryer and a humidifier under controlled conditions for temperature, humidity, air volume, and time. Subsequently, TAC films were bonded to both surfaces of the polarizer through a PVA-based adhesive in order to provide a polarizing plate.

COMPARATIVE EXAMPLE 1

A polarizer was obtained by dyeing a PVA film supplied by Kuraray Co., Ltd. (9X75RS) in a first bath (a 30° C. aqueous solution containing both iodine and KI) while stretching to 3 times, further stretching in a second bath (a 55° C. aqueous solution containing both boric acid and KI) so as to stretch the film to 6 times in total. Later, the polarizer was adjusted to have moisture content of 4% by means of a dryer and a humidifier under controlled conditions for temperature, humidity, air volume, and time. Subsequently, TAC films were bonded to both surfaces of the polarizer through a PVA-based adhesive in order to provide a polarizing plate.

COMPARATIVE EXAMPLE 2

A polarizer was obtained by dyeing a PVA film supplied by Kuraray Co., Ltd. (9X75RS in a first bath (a 30° C. aqueous solution containing both iodine and KI) while stretching to 3 times, further stretching in a second bath (a 55° C. aqueous solution containing both boric acid and KI) so as to stretch the film to 6 times in total Later, the polarizer was adjusted to have moisture content of 35% by means of a dryer and a humidifier under controlled conditions for temperature, humidity, air volume, and time. Subsequently, TAC films were bonded to both surfaces of the polarizer through a PVA-based adhesive in order to provide a polarizing plate. In Comparative Example 2, however, irregularities occurred in the surfaces of the polarizing plate due to the drying treatment for bonding to the TAC film, because the moisture content was as high as 35%.

The polarizing plates obtained in the Examples 1–3 and Comparative Examples 1–2 were evaluated. Optical properties to be measured were transmittance and a polarization degree for each plate. An instrument for measuring surface roughness shape (SURFCOM 470A supplied by TOKYO SEIMITSU CO., LTD.) was used for measuring centerline average roughness (Ra) in a direction of the polarizing axis of the polarizing plate (a direction perpendicular to the stretching axis) and also mean spacing (Sm) of irregularities forming the streaks. Streaks were checked visually for the polarizing plates. The results are shown in Table 1.

TABLE 1

| | Polarizer | Polarizing plate | | | | |
| --- | --- | --- | --- | --- | --- | --- |
| | Moisture | Transmittance | Polarization | Surface roughness | | |
| | content (%) | (%) | degree (%) | Ra (μm) | Sm (mm) | Visual observation |
| Com. Ex. 1 | 4 | 43.8 | 99.95 | 0.08 | 0.75 | Prominent streaks |
| Example 1 | 6 | 43.8 | 99.95 | 0.03 | 1.81 | Pale streaks |
| Example 2 | 15 | 43.8 | 99.94 | 0.01 or less | Unmeasurable | No streak |
| Example 3 | 26 | 43.8 | 99.94 | 0.01 or less | Unmeasurable | No streak |
| Com. Ex. | 35 | 43.8 | 99.90 | 0.01 or less | Unmeasurable | No streak |

*Com. Ex.: Comparative Example

As indicated in Table 1, values of the centerline average roughness (Ra) for the polarizing plates (Examples 2–3) of the present invention were small and the mean spacing of the irregularities (Sm) was unmeasurable. No streaks were recognized visually. Pale streaks recognized in the poling plate of Example 1 were not a substantial obstacle in use.

For the polarizing plate of Comparative Example 1, which was produced under a condition of humidity out of the claimed range, the centerline average roughness (Ra) was remarkable and the mean spacing (Sm) was large. Moreover, streaks were recognized visually. The polarizing plate in Comparative Example 2 was good for the centerline average roughness (Ra) and the mean spacing (Sm). However, the polarization degree was inferior, and irregularities in the surface were recognized, resulting in inferior appearance.

As mentioned above, the present invention provides a polarizing plate having improved appearance and also a liquid crystal display comprising the polarizing plate. In a method for producing the polarizing plate by bonding a protective layer on at least one surface of a polarizer, moisture content of the polarizer is limited to a range from 5% to 30% so that the protective layer would not have substantial irregularities like record grooves on the surface, which would be caused by stretching of the polarizing film. Such a polarizing plate can provide clear images even when reflected light is applied. Moreover, the method of the present invention can provide a polarizing plate having transmittance of at least 35% and a polarization degree of at least 90%.

The invention may be embodied in other forms without departing from the spirit or essential characteristics thereof. The embodiments disclosed in this application are to be considered in all respects as illustrative and not limiting. The scope of the invention is indicated by the appended clams rather than by the foregoing description, all changes that come within the meaning and range of equivalency of the claims are intended to be embraced therein.

What is claimed is:

1. A method of producing a polarizing plate comprising a polarizer and a protective layer bonded to at least one surface of the polarizer, wherein moisture content of the polarizer is in a range from 5% to 30% when the protective layer is bonded to the polarizer, wherein a surface roughness of the polarizing plate in a direction perpendicular to the stretching direction is 0.04 μm or less on the basis of the centerline average roughness, and wherein the polarizing plate has transmittance of at least 35% and a polarization degree of at least 90%, and wherein the moisture content of the polarizer is in a range from 15% to 30% when the protective layer is bonded to the polarizer, provided that the moisture content is obtained by a calculation based on an equation of moisture content (%)=[(A−B)/B]×100, where A denotes a weight of the polarizer before bonding and B denotes a weight of the polarizer after being kept in a dryer of 120° C. for seven hours.

2. The method according to claim 1, wherein the protective layer is bonded to the polarizer through an adhesive layer.

3. The method according to claim 1, wherein the polarizer is prepared by stretching a hydrophilic polymer film while dyeing the hydrophilic polymer film in a dye bath containing a dye selected from the group consisting of dichroic iodine and dichroic dyestuff and crosslinking in a crosslinking bath containing a crosslinking agent.

4. The method according to claim 3, wherein the hydrophilic polymer film is a polyvinyl alcohol-based film.

5. The method according to claim 1, wherein a reflecting plate is additionally laminated.

6. The method according to claim 1, wherein a semitransparent reflecting plate is additionally laminated.

7. The method according to claim 1, wherein a retardation plate (X plate) is additionally laminated in order to cope with elliptically or circularly polarized light.

8. The method according to claim 1, wherein a viewing angle compensating plate is additionally laminated.

9. The method according to claim 1, wherein a brightness enhancement film is additionally laminated through either an adhesive or a pressure-sensitive adhesive.

10. The method according to claim 1, wherein surface roughness of the polarizing plate in a direction perpendicular to the stretching direction is 0.03 μm or less on the basis of the centerline average roughness.

11. The method according to claim 1, wherein surface roughness of the polarizing plate in a direction perpendicular to the stretching direction is 0.01 μm or less on the basis of the centerline average roughness.

12. A liquid crystal display comprising a liquid crystal cell and a polarizing plate bonded to at least one surface of the liquid crystal cell, wherein the polarizing plate comprises a protective layer bonded to at least one surface of a polarizer when moisture content of the polarizer is in a range from 5% to 30%, wherein a surface roughness of the polarizing plate in a direction perpendicular to the stretching direction is 0.04 μm or less on the basis of the centerline average roughness, and wherein the polarizing plate having transmittance of at least 35% and a polarization degree of at least 90% comprises a protective layer bonded to at least one surface of a polarizer, when moisture content of the polarizer is in a range from 15 to 20%, provided that the moisture content is obtained by a calculation based on an equation of moisture content (%)=[(A−B)/B]×100, where A denotes a weight of the polarizer before bonding and B denotes a weight of the polarizer after being kept in a dryer of 120° C. for seven hours.

13. The liquid crystal display according to claim 12, wherein the protective layer is bonded to the polarizer through an adhesive layer.

14. The liquid crystal display according to claim 12, wherein the polarizer is prepared by stretching a hydrophilic polymer film while dyeing the hydrophilic polymer film in a dye bath containing a dye selected from the group consisting of dichroic iodine and dichroic dyestuff and crosslinking in a crosslinking bath containing a crosslinking agent.

15. The liquid crystal display according to claim 14, therein the hydrophilic polymer film is a polyvinyl alcohol-based film.

16. The liquid crystal display according to claim 12, wherein a reflecting plate is additionally laminated.

17. The liquid crystal display according to claim 12, wherein a semitransparent reflecting plate is additionally laminated.

18. The liquid crystal display according to claim 12, wherein a retardation plate (λ plate) is additionally laminated in order to cope with elliptically or circularly polarized light.

19. The liquid crystal display according to claim 12, wherein a viewing angle compensating plate is additionally laminated.

20. The liquid crystal display according to claim 12, wherein a brightness enhancement film is additionally laminated through either an adhesive or a pressure-sensitive adhesive.

21. The liquid crystal display according to claim 12, wherein surface roughness of the polarizing plate in a direction perpendicular to the stretching direction is 0.03 μm or less on the basis of the centerline average roughness.

22. The liquid crystal display according to claim 12, wherein surface roughness of the polarizing plate in a direction perpendicular to the stretching direction is 0.01 μm or less on the basis of the centerline average roughness.

23. A method of producing a polarizing plate comprising a polarizer and a protective layer bonded to at least one surface of the polarizer, wherein moisture content of the polarizer is in a range from 5% to 30% when the protective layer is bonded to the polarizer, wherein a surface roughness of the polarizing plate in a direction perpendicular to the stretching direction is 0.01 μm or less on the basis of the centerline average roughness.

24. The method according to claim 23, wherein the protective layer is bonded to the polarizer through an adhesive layer.

25. The method according to claim 23, wherein the polarizer is prepared by stretching a hydrophilic polymer film while dyeing the hydrophilic polymer film in a dye bath containing a dye selected from the group consisting of dichroic iodine and dichroic dyestuff and crosslinking in a crosslinking bath containing a crosslinking agent.

26. The method according to claim 25, wherein the hydrophilic polymer film is a polyvinyl alcohol-based film.

27. The method according to claim 23, wherein a reflecting plate is additionally laminated.

28. The method according to claim 23, wherein a semitransparent reflecting plate is additionally laminated.

29. The method according to claim 23, wherein a retardation plate (λ plate) is additionally laminated in order to cope with elliptically or circularly polarized light.

30. The method according to claim 23, wherein a viewing angle compensating plate is additionally laminated.

31. The method according to claim 23, wherein a brightness enhancement film is additionally laminated through either an adhesive or a pressure-sensitive adhesive.

32. The method according to claim 23, wherein a surface roughness of the polarizing plate in a direction perpendicular to the stretching direction is 0.03 μm or less on the basis of the centerline average roughness.

33. The method according to claim 23, wherein a surface roughness of the polarizing plate in a direction perpendicular to the stretching direction is 0.01 μm or less on the basis of the centerline average roughness.

* * * * *